March 10, 1936.   C. J. DENNEHY   2,033,818
STEERING WHEEL ASSEMBLY FOR JUVENILE VEHICLES
Filed June 24, 1935
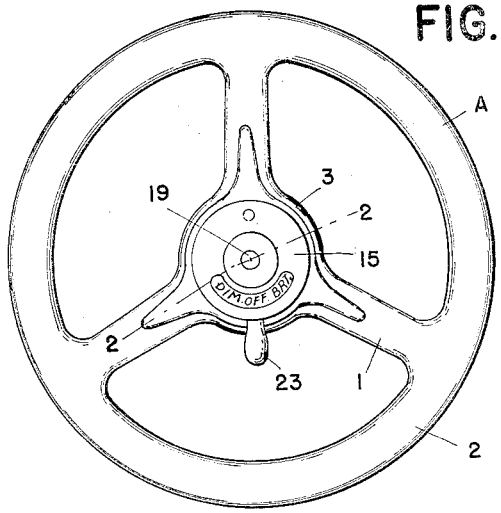
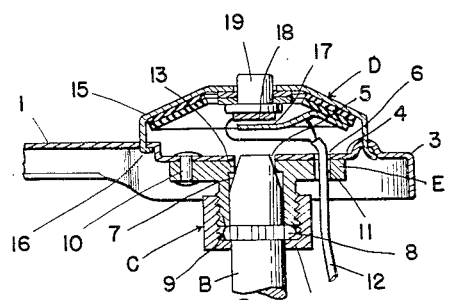
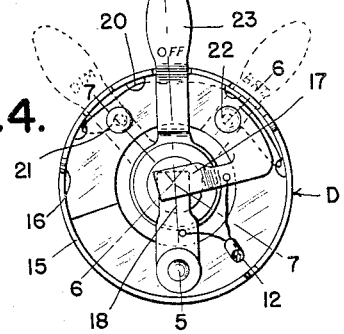
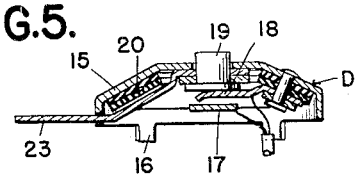
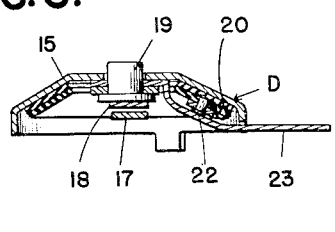
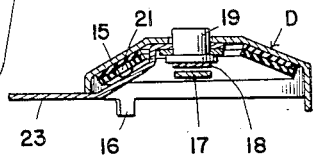
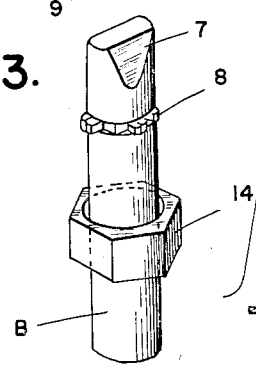
INVENTOR
CORNELIUS J. DENNEHY
BY
ATTORNEYS Patented Mar. 10, 1936

2,033,818

UNITED STATES PATENT OFFICE 2,033,818

STEERING WHEEL ASSEMBLY FOR JUVENILE VEHICLES

Cornelius J. Dennehy, Toledo, Ohio, assignor to The American-National Company, Toledo, Ohio, a corporation of Ohio Application June 24, 1935, Serial No. 28,184

10 Claims. (Cl. 208—114)

This invention relates generally to steering wheel assemblies and refers more particularly to those designed for juvenile vehicles such as juvenile automobiles.

Heretofore in the manufacture of juvenile vehicles it has been customary when connecting the steering wheel to its supporting post to extend the post upwardly through the hub of the wheel and hold it in place by a nut on top of the wheel. However, the use of a nut on the post above the wheel not only made the assembly unsightly but precluded the mounting on top of the wheel at this point of a switch or push button for controlling electric circuits to lights or other fixtures on the vehicle.

With the present construction, however, I am able to effectively connect in an inexpensive manner the post to the wheel and at the same time mount a switch on top of the wheel hub. In fact, the connection and mounting are such that the connection between the post and wheel is covered by the switch mounting, hence the construction and arrangement of parts enhance the appearance of the assembly.

In the accompanying drawing:

Figure 1 is a top plan view of a steering wheel assembly embodying my invention;

Figure 2 is a sectional view taken on the line 2—2 of Figure 1;

Figure 3 is a group perspective of the assembly with parts broken away and in section;

Figure 4 is a bottom plan view of the switch per se;

Figure 5 is a sectional view taken on the line 5—5 of Figure 4;

Figure 6 is a sectional view taken on the line 6—6 of Figure 4;

Figure 7 is a sectional view taken on the line 7—7 of Figure 4.

Referring now to the drawing, A is a steering wheel, B is a supporting post therefor, C is a connection between the post and wheel, and D is an electric switch of a juvenile vehicle steering wheel assembly embodying my invention.

As shown, the wheel A has a pressed metal spider 1 and rim 2. Preferably the hub 3 of the spider has a depressed portion 4 of circular configuration provided at the center thereof with an elongated slot 5 and having circular holes 6 about said slot. The post B comprises a cylindrical rod having a tapered end 7 for engagement with the slot 5 in the wheel spider and having short radially extending projections 8 below but adjacent said tapered end 7 for engagement with the lower end of a depending exteriorly threaded tubular portion 9 of a casting E fastened by rivets 10 to the underside of the wheel hub 3. Preferably the casting E has a hole 11 therein registering with one of the holes 6 in the wheel hub for the reception of wiring 12 from the switch D, while the rivets 10 engage the remaining holes 6 in the wheel spider. The casting E also has opposed lugs 13 at the upper end of the tubular portion 9 for engagement with opposite sides of the tapered end 7 of the post to hold the latter against turning in the slot 5 in the wheel hub. A nut 14 is sleeved on the post B against the projections 8 and engages the exteriorly threaded portion 9 of the casting to hold the post B against displacement axially from the casting.

In the present instance, the tapered end 7 of the post B terminates substantially flush with the upper face of the depressed portion 4 of the wheel hub and is covered by the switch D. Preferably the casing 15 of the switch D is inverted cup-shape in configuration and rests upon the hub 3 over the depressed portion 4 thereof. Any suitable means such as the prongs 16 projecting from the edges of the casing 13 may be used to secure the said casing to the hub 3 of the wheel.

Any suitable switch mechanism such as stationary and movable contacts 17 and 18, respectively, push button 19 for the movable contact 18, resistance wire 20, spaced terminals 21 and 22 for said wire 20, and a control lever 23 on the push button 19 for engagement with the terminals 21 and 22 may be employed in the casing 15 for controlling the flow of electric current through the wiring 12 to a light or other electrical device (not shown) carried by the juvenile vehicle upon which my steering wheel is mounted. Such mechanism per se is conventional and forms no part of my invention. The essence of my invention resides in the improved connection between the post B and wheel A; the switch mounting means including the casing 15 and the construction and arrangement of parts whereby the switch D may be mounted on top of the wheel hub to cover the connection mentioned.

What I claim as my invention is:

1. In a steering wheel assembly for juvenile vehicles, a pressed metal steering wheel having a hub provided with a depressed portion, the base of said depressed portion having an elongated slot therein and having holes about said slot, a supporting post for said wheel having a tapered end engaging said slot and terminating substantially flush with the base of said depressed portion, said post being provided adjacent said tapered end with a lateral projection, and a connection between said post and wheel including a casting having a head on the underside of the base of said depressed portion and having a depending tubular portion sleeved on said post at the tapered end thereof, the head of said casting having holes registering with the holes in the base of the depressed portion of said hub, securing elements for said casting engaging certain of the holes in the head and in the base of the depressed portion, at least one hole in the head and in the base of the depressed portion being unobstructed for the reception of electric wiring, and a nut adjustable on the tubular portion of the casting and having a portion holding the projection aforesaid of the post against the tubular portion of the casting so that the post will be held against axial displacement from the casting.

2. In a steering wheel assembly for juvenile vehicles, a pressed metal steering wheel having a hub provided with a depressed portion, the base of said depressed portion having an elongated slot therein and having holes about said slot, a supporting post for said wheel having a tapered end engaging said slot, said post being provided adjacent said tapered end with a lateral projection, and a connection between said post and wheel including a casting having a head on the underside of the base of said depressed portion and having a depending tubular portion sleeved on said post at the tapered end thereof, the head of said casting having holes registering with the holes in the base of the depressed portion of said hub, securing elements for said casting engaging certain of the holes in the head and in the base of the depressed portion, and a nut adjustable on the tubular portion of said casting and having a portion engaging the projection aforesaid of the post and holding the tapered end of the post against displacement from the slot in the wheel hub.

3. In a steering wheel assembly for juvenile vehicles, a steering wheel having a hub provided with a slot and holes about said slot, a supporting post for said wheel having an end engaging said slot, said post being provided adjacent said end with a lateral projection, and a connection between said post and wheel including a casting having a head on the underside of the wheel hub and having a depending tubular portion sleeved on said post at the end aforesaid thereof, said head having holes registering with the holes in the wheel hub, securing elements for said casting engaging certain of the holes in the head and in the wheel hub, and a nut adjustable on the tubular portion of the casting and having a part holding the projection aforesaid of said post against the tubular portion of said casting.

4. In a steering wheel assembly for juvenile vehicles, a steering wheel having a hub provided with a slot and holes about said slot, a supporting post for said wheel having an end engaging said slot, said post being provided adjacent said end with a lateral projection, and a connection between said post and wheel including a member on the underside of said wheel hub having a depending tubular portion sleeved on the post at the end aforesaid thereof, said member having holes registering with the holes in the wheel hub, securing elements for said member engaging certain of the holes in said member and in the wheel hub, and a nut adjustable on the tubular portion of said member and having a part engaging the projection aforesaid of the post and holding the latter against displacement from the slot in said wheel hub.

5. In a steering wheel assembly for juvenile vehicles, a steering wheel having a hub provided with a slot and holes about said slot, a supporting post for said wheel having an end engaging said slot, said post being provided adjacent said end with a lateral projection, and a connection between said post and wheel including a casting having a head on the underside of the wheel hub and having a depending tubular portion sleeved on the post at the end aforesaid thereof, said head having holes registering with the holes in the wheel hub and having means engaging said post to hold the same against turning in the slot in the wheel hub, securing elements for said casting engaging certain of the holes in the head and wheel hub, and a nut adjustable on the tubular portion of the casting and having a portion engaging the projection aforesaid of the post and holding the latter against displacement from the slot in the wheel hub.

6. In a steering wheel assembly for juvenile vehicles, a steering wheel having a hub provided with an elongated slot and holes about said slot, a supporting post for said wheel having a tapered end engaging said slot and being provided adjacent said tapered end with a lateral projection, and a connection between said post and wheel including a casting having a head on the underside of the wheel hub and having a depending tubular portion sleeved on the post at the tapered end thereof, the head of said casting having holes registering with the holes in the wheel hub and having opposed lugs engaging opposite sides of the tapered end of the post to hold the latter against turning in the slot in the wheel hub, securing elements for said casting engaging certain of the holes in the head and in the wheel hub, and a nut adjustable on the tubular portion of the casting and having a portion engaging the projection aforesaid of the post and holding the tapered end of the post against the opposed lugs aforesaid.

7. In a steering wheel assembly for juvenile vehicles, a steering wheel having a hub provided with an elongated slot and holes about said slot, a supporting post for said wheel having a tapered end engaging said slot and provided adjacent said tapered end with a lateral projection, a connection between said post and wheel including a member on the underside of the wheel hub having a depending tubular portion sleeved on the post at the tapered end thereof, said member having holes registering with the holes in the wheel hub, securing elements for the member engaging certain of the holes in the member and in the wheel hub, a nut adjustable on the tubular portion of said member and having a portion engaging the projection aforesaid of the post and holding the tapered end of the post against displacement from the slot in the wheel hub, and an electric switch covering the connection between the post and wheel and including an inverted cup-shaped casing resting on and secured to the wheel hub about the slot therein.

8. In a steering wheel assembly for juvenile vehicles, a steering wheel having a hub provided with an elongated slot and holes about said slot, a supporting post for said wheel having a tapered end engaging said slot and provided adjacent said tapered end with a lateral projection, a connection between said post and wheel including a member on the underside of the wheel hub having a depending tubular portion sleeved on the post at the tapered end thereof, said member having holes registering with the holes in the wheel hub, securing elements for the member engaging certain of the holes in the member and in the wheel hub, a nut adjustable on the tubular portion of said member and having a portion engaging the projection aforesaid of the post and holding the tapered end of the post against displacement from the slot in the wheel hub, an electric switch covering the connection between the post and wheel and including an inverted cup-shaped casing resting on the wheel hub about the slot therein, and means securing the casing to the wheel hub including tongues projecting from the casing at the edges thereof and extending through and bent under the wheel hub at spaced points about the slot therein.

9. In a steering wheel assembly, a steering wheel having a hub provided with a depressed portion, the base of said portion having an opening for the reception of a supporting post and having a hole at one side of said opening for the reception of electric wiring, and an electric switch serving as a cover for said opening and hole and including an inverted cup-shaped casing resting upon and secured to said wheel hub about the depressed portion thereof.

10. In a steering wheel assembly, a steering wheel having a hub, a supporting post for said wheel provided adjacent an end thereof with a lateral projection, a member upon the underside of and rigid with said wheel hub, said member having a depending tubular portion receiving the end aforesaid of said post, said member having opposed portions holding the post against turning movement relative to the wheel hub, and means for holding the post against axial displacement relative to the wheel hub including a nut adjustable on the depending tubular portion of the member aforesaid and having a portion binding the lateral projection of the post against the depending tubular portion of said member.

CORNELIUS J. DENNEHY.